United States Patent [19]

Anderson

[11] Patent Number: 4,909,519
[45] Date of Patent: Mar. 20, 1990

[54] PIPE JOINT COMPRESSION SEAL

[75] Inventor: Kenneth W. Anderson, Springfield, Ill.

[73] Assignee: Anderson Seal Company, Rochester, Ill.

[21] Appl. No.: 196,286

[22] Filed: May 20, 1988

[51] Int. Cl.$^4$ .............................................. F16J 15/10
[52] U.S. Cl. ................................ 277/207 A; 277/186; 285/230
[58] Field of Search ................. 285/230, 288, 55, 291; 277/181–183, 186, 189, 207 R, 207 A

[56] References Cited

U.S. PATENT DOCUMENTS

| | | | |
|---|---|---|---|
| 2,401,554 | 6/1946 | Davids | 277/207 A |
| 2,445,963 | 7/1948 | Montgomery | 277/207 A |
| 2,537,659 | 1/1951 | Eisner et al. | 285/230 |
| 2,770,476 | 11/1956 | Cleverly | 277/207 A |
| 3,059,941 | 10/1962 | Kaynor et al. | 277/207 A |
| 3,298,697 | 1/1967 | Ohnstad | 277/207 A |
| 3,575,445 | 4/1971 | French | 285/55 |
| 3,591,191 | 7/1971 | Coderre | 277/207 A |
| 3,764,151 | 10/1973 | Elder et al. | 277/207 A |
| 3,767,232 | 10/1973 | Smith | 285/137.1 |
| 3,858,912 | 1/1975 | Bower | 285/230 |
| 4,084,828 | 4/1978 | Jones | 277/207 A |
| 4,186,931 | 2/1980 | Anderson | 277/186 |
| 4,394,025 | 7/1983 | Anderson | 277/186 |
| 4,592,674 | 6/1986 | Baliva | 277/207 A |
| 4,702,498 | 10/1987 | Mueller et al. | 285/55 |

FOREIGN PATENT DOCUMENTS 35774 9/1975 Australia .............................. 285/230

Primary Examiner—William A. Cuchlinski, Jr.
Assistant Examiner—Jeffrey J. Hohenshell
Attorney, Agent, or Firm—Lowe, Price, LeBlanc, Becker & Shur

[57] ABSTRACT

A pressure resistant system for joining concrete pipes in an end to end relationship is disclosed. The first pipe terminates in a bell end and the second pipe terminates in a spigot end with the spigot end surrounded by a seal member and the inner surface of the bell also surrounded by a seal member. Each seal member has internal ribs which extend into and are embedded in the concrete pipe. The spigot end sealing ring includes an internal flap extending substantially perpendicular thereto across an internal offset face of the spigot and a lip extending across a portion of the end face. A rib of reduced length is disposed adjacent the lip and midway between the lip and the flap. In one embodiment the spigot and sealing ring defines a concave groove for receiving an O-ring seal, and in another embodiment the concave groove is replaced by an integral convex seal portion.

6 Claims, 3 Drawing Sheets

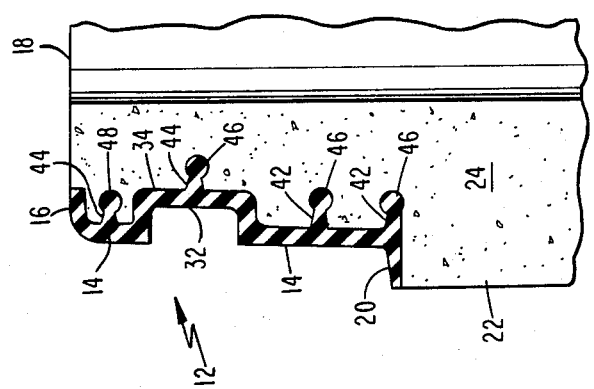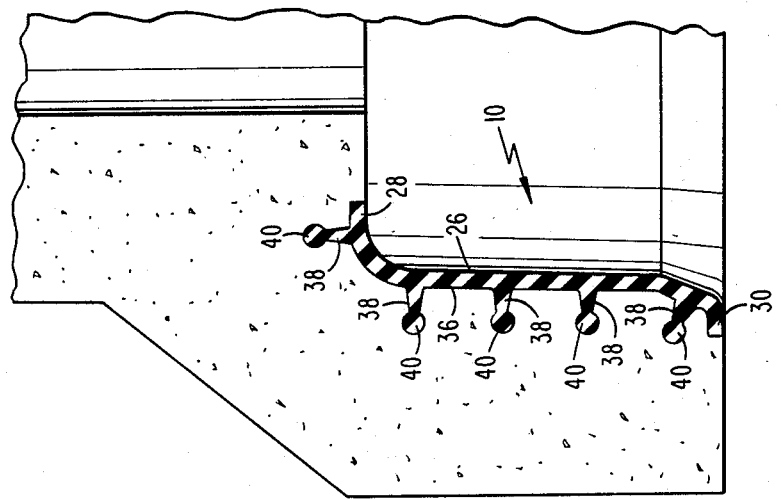

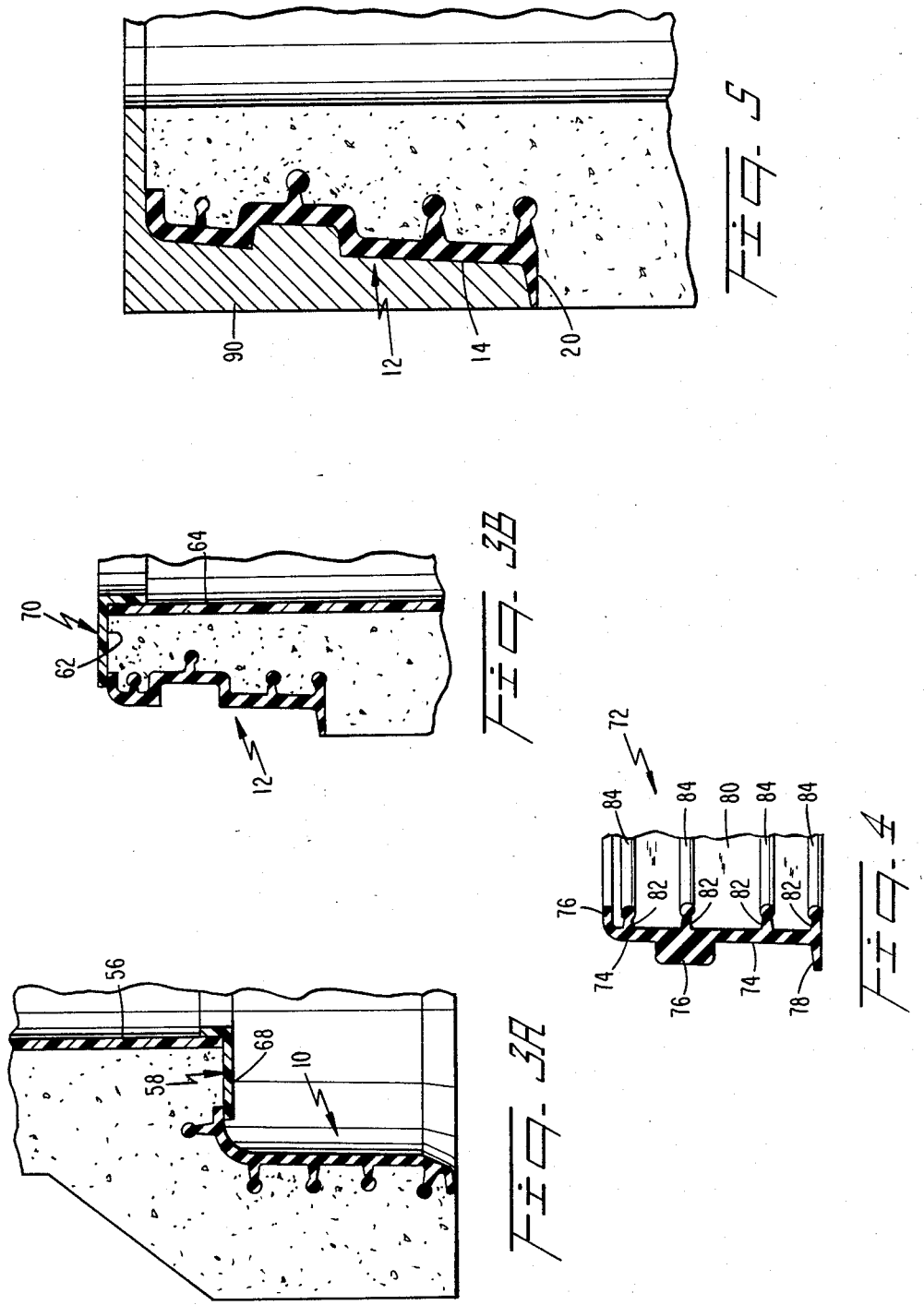

PIPE JOINT COMPRESSION SEAL

Technical Field

This invention relates to an improved joint for non-metallic pipe such as concrete. The seal of this invention is intended to comply with the testing requirements for concrete sewer pipe in one embodiment and for lined concrete pipe for transmitting corrosive liquids in another embodiment.

Background Art

In my prior U.S. Pat. No. 4,186,931 there is described an end sealing system or concrete pipe. The basic design provides a resilient seal member having protrusions embedded in the concrete, and a snap ring or O-ring disposed between the sealing members. The pipes are typically cast with a seal member embedded in the spigot end, surrounding the spigot, and a seal member embedded in the bell end surrounding the interior of the bell. In that patent, a groove was provided in the spigot seal to receive the O-ring or snap ring.

While that seal as described in my above patent was adequate for many purposes, in my U.S. Pat. No. 4,394,025 there is described an improved seal capable of withstanding very substantial internal pressure of up to 50-60 pounds per square inch. In that design the bell seal was very similar. However, the spigot seal member had a changed design wherein the lower end constituted a flap disposed at 45° to the seal members itself, which flap was entirely embedded within the spigot member concrete. In addition, instead of a groove for receiving the snap ring, the spigot seal had a concave depression. The seal member itself was substantially the same thickness throughout, but the concave ring receiving portion then extended into the concrete and terminated in a rib extending even further into the concrete. Each rib consists of a flange portion with a terminal bead which in cross-section has a diameter greater than the thickness of the supporting flange.

In both of my above-identified patents the internal ribs are intended to prevent tee leakage of liquid at the seal-concrete interface in both the bell and the spigot. It has been found that the placement of the ridges is very important. For example, in my U.S. Pat. No. 4,394,025 the combination of the depending flap in the spigot seal and the placement of the internal ridges provided a seal able to withstand relatively high internal pressures. The flap, however, created difficulty in casting the bell end in that the "tongue former" or mold used to form the spigot end would permit the flow of concrete between the tongue former and the seal member. Accordingly, it is desirable to eliminate that flap from a seal design and yet provide a design capable of withstanding at least the normal pressures encountered in a sewer system.

In addition, the design in my U.S. Pat. No. 4,394,025 provided for a rib extending inwardly from the concave depression in the spigot end. The normal length of this rib resulted in a reduced thickness of concrete at the concave depression. Therefore, the tongue member formed had a weakness in shear at this point.

In contrast, in my prior U.S. Pat. No. 4,186,931, neither a concave depression nor a depending flap was provided in the tongue member seal. In that design, the snap ring or O-ring was retained within a groove in the spigot member seal and the interface between the seal and concrete was parallel to the internal surface of the pipe except for a plurality of ribs embedded in the concrete. While no one portion of the tongue member was weaker than another in shear in that design, in order to provide the groove for retaining the snap or O-ring, the seal member had a substantial thickness which of necessity reduced the thickness of the supporting concrete at the spigot end of the pipe.

Accordingly, there is a need to provide a seal for non-metallic or concrete pipe which will withstand pressures reasonably expected to be encountered in a sewer conduit but which also will minimize the susceptibility of the tongue end to shear forces.

The disclosures of my U.S. Pat. Nos. 4,186,931 and 4,394,025 are hereby incorporated by reference.

In the case of caustic chemicals or corrosive liquids and in certain sewer installations, it is desired to utilize a pipe having a lining of a plastic material to resist attack by the corrosive materials directed at the pipe walls. Especially in the case of concrete piping it is desirable to protect the interior walls with a thin coating or liner of an inert plastic material which may be polyvinylchloride, fiberglass, or any other similar resinous material. In U.S. Pat. No. 3,217,077 there is described a process whereby fiberglass is initially sprayed onto a form and before the fiberglass lining is cured, concrete is cast there around so that the concrete pipe will be fully encased inside and out with the fiberglass resinous material. By casting before the initially sprayed lining is set, when the concrete sets and the fiberglass cures the two will be adherent to each other. In that case the spigot end however of the pipe is formed entirely of a plastic material rather than concrete. Obviously also this procedure is relatively extensive and requires precise process control.

Another procedure for preparing lined conduit material is described in U.S. Pat. No. 3,767,232. In that patent, directed to air tight conduits for electrical cables and the like a casing serves as the concrete form and abuts an end plate. The outer surface of the poured conduit is not covered by a plastic material. However, the inner surface, the casing, must be of substantial thickness in order to serve as a form for the concrete to be poured around it.

Recently companies have been utilizing flexible plastic liners in large pipe. The liners are extended through sections and heat welded at the joint where they overlap. This procedure, however, is limited to pipes having diameters of 36 inches or more. Pipes of lesser diameters will not admit the necessary equipment for heat welding the overlapping casings.

There is therefore a need to provide an improved seal for the bell and spigot ends of concrete pipe which is equally adaptable to lined or unlined pipe, and in the case of lined pipe can easily be formed with the liner to fully protect the interior surfaces of the pipe from any corrosive chemicals which may be contained in a conduit formed of such pipe.

Disclosure of the Invention

It has now been discovered that the Anderson seal described in the above-described patents can be adapted to formation of a seal for non-metallic pipe including concrete pipe which will encase the spigot end of the pipe and surround the interior of the bell end and which seal will successfully meet and exceed the testing requirements for sewer pipe. In addition, the seal of this invention can be easily adapted to lined pipe by utilizing a strip or L-shaped connector which may be easily heat welded to both the liner and the seal. The seal of this invention further provides increased resistance to shear forces at the tongue end.

The tongue end seal of this invention instead of utilizing a flap depending at about 45° from the end thereof which is embedded in the concrete, utilizes a flap disposed at a 90° angle to the seal which extends across the face of the conduit portion from which the tongue end extends. The tongue former mold then will fit against this seal and successfully resist concrete working between the seal and the tongue former mold. The tongue end further provides a concave depression for receiving a snap ring or O-ring, but the interior portion thereof mounts a rib having a substantially reduced dimension. To facilitate further the sealing of the interface between the tongue end seal member and the concrete, an additional rib is provided adjacent the mouth of the tongue which further is embedded in concrete after the pipe is formed.

In a second embodiment of this invention, wherein lined pipe is provided, the seals of this invention are interconnected at both the bell end and the spigot end with the liner by a heat welded flap of plastic material which is either L-shaped or flat. In this way, lined pipe having diameters of less than 36 inches can be provided, four-inch diameter pipe being the smallest diameter currently commercially fabricated.

The seal of this invention in a yet further embodiment at the tongue end eliminates both the separate O-ring or snap ring and the concave depression in favor of an integral ring projection extending outwardly from the tongue end. This projection integral with the tongue end of the seal serves as the separate O-ring utilized in other embodiments of this invention but eliminates the possibility that upon assembly the O-ring will move out of position or wedge in an undesirable position.

Brief Description of Drawings

These and other objects will become readily apparent with reference to the drawings and following description wherein:

FIG. 1A is a fragmentary view in cross-section of the bell end of a pipe mounting the seal of this invention.

FIG. 1B is a fragmentary cross-sectional view similar to FIG. 1A illustrating the tongue end seal of this invention.

FIG. 3A is a view similar to FIG. 2A utilizing an L-shaped connector between the pipe lining and bell end seal.

FIG. 3B is a view similar to FIG. 2B showing the L-shaped connector between the spigot end seal and the liner.

FIG. 4 is an alternate embodiment of this invention showing the integral O-ring for a tongue end seal.

FIG. 5 is a fragmentary cross-sectional view illustrating the tongue former mold in connection with molding a tongue end with the seal of this invention.

Figure 2B:
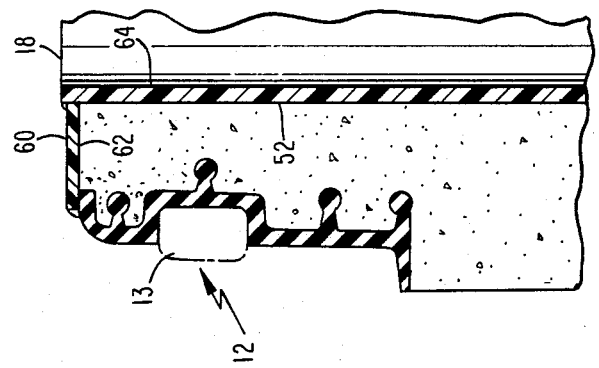
FIG. 2B is a fragmentary cross-sectional view similar to FIG. 1A illustrating the tongue end seal in a lined pipe.

Best Mode for Carrying out the Invention

Precast concrete pipe must meet certain leakage tests set forth by ASTM standards. The leakage tests applicable to pipe installations are water infiltrations, water exfiltration and low pressure air tests of the sewer line and water exfiltration and low pressure air tests of individual joints. In low pressure air tests the sewer line to be tested is plugged at both ends, air pressure within the line is changed from atmospheric and the change in air pressure over a specified time period is measured. Test procedures and criterion are prescribed in ASTM Standard C924, Testing Concrete Sewer Lines By Low Pressure Air Test Method. The method includes both increasing the air pressure within the plugged line and measuring the pressure drop over a period of time or creating a partial vacuum within the plugged line and measuring the pressure increase over a period of time.

Due to the physical differences between air and water and the difference in behavior of gases and fluids under pressure conditions, there is no direct correlation between air loss and water infiltration and exfiltration. In most cases, the air test is a "go" or a "no go" situation, and, if the sewer passes this test, it should perform satisfactorily under an infiltration or exfiltration test. In the event of failure to pass the air test, the sewer line should be subjected to a water infiltration or exfiltration test as prescribed in ASTM Standard C969 before rehabilitation or reconstruction is considered.

ASTM C924 specifies the test method, criteria and procedures, and limits the size of the pipe that can be tested to four inches through 24-inch diameters. The lower limit of four-inch diameter is the smallest sized concrete pipe currently produced in North America. The upper limit of 24-inch diameter was established primarily for safety reasons, and the fact that larger diameters can be more readily tested by visual inspection or testing of individual joints.

The time pressure drop method is the most commonly used in air test method. The section of sewer line to be tested is isolated, and the internal air pressure is raised to a specified level. If the pressure drop is one pound per square inch or less within a specified time interval the line is acceptable.

For safety reasons and to prevent damage to joint integrity, under no circumstances should the sewer line and laterals be subjected to more than six pounds per square inch air pressure difference from atmospheric. Table 1 below specifies the minimum test times versus pipe diameter in inches. For example, a 24-inch diameter pipe must not permit a pressure drop of more than one pound per square inch in a time of 3.6 minutes per hundred feet or 2.16 seconds per foot.

TABLE 1

| Pipe Diameter, inches | Minimum Test Times | | |
|---|---|---|---|
| | T, minutes per 100 feet | Pipe Diameter, inches | T, minutes per 100 feet |
| 4 | 0.3 | 15 | 2.1 |
| 6 | 0.7 | 18 | 2.4 |
| 8 | 1.2 | 21 | 3.0 |
| 10 | 1.5 | 24 | 3.6 |
| 12 | 1.8 | | |

With attention to FIGS. 1A and 1B, there is shown there a bell end seal 10 and a spigot end seal 12 with an O-ring 13 in phantom of this invention. The overall height of the two seals is slightly less than four inches. Spigot end seal 12 includes a seal-to-seal interface surface 14 which extends longitudinally terminating in a 90° flange 16 at the top thereof which surrounds the mouth of the spigot 18 and a flap 20 which extends from the interface surface 14 at a 90° angle thereto terminating at the outer edge 22 of the spigot 24.

Similarly, bell end seal 10 has a longitudinally extending seal interface surface 26 which extends to an inner 90° flange 28 at one end thereof, and a 90° flange 30 at the opposite end. Surface 14 then interfaces with surface 26, surface flange 16 then interfaces with surface 28 and surface 20 interfaces with surface 30 when spigot 1 is telescoped within bell 10. A concave depression 32 is formed in spigot end seal 12 to receive a convention snap ring or O-ring 13. Spigot end seal 12 also has a surface 34 which interfaces with the concrete pipe spigot and bell end seal 10 has a similar surface 36 which interfaces with the concrete pipe bell. In general, in the preferred embodiment, the distance between surfaces 14 and 34, and 26 and 36, the thickness of each seal is about 3/16 inch. Surface 36 mounts a plurality of mutually spaced ribs 38 which extend outwardly from surface 36. In the preferred embodiment each rib tapers from a thickness of about 3/16 inch to a thickness of about ⅛ inch adjacent the terminal bead 40. Preferably the length of rib 38 is ¼ inch, and diameter of bead 40 is ¼ inch. It should be noted that the beads 38 extend perpendicularly from surface 36.

With reference to FIG. 1B, surface 34 similarly mounts a plurality of mutually spaced ribs 42, and 44. Ribs 42 and 44 extend perpendicularly from surface 34 and mount beads 46 and 48. Ribs 42 are preferably ¼ inch in length and ribs 44 as will be subsequently explained are preferably ⅛ inch in length. Beads 46 are ¼ inch in diameter and bead 48 is preferably 3/16 to 5/32 inch in diameter.

The bead shown extending from concave depression 32 has a shortened length in order to maximize the strengthening concrete between it and the inner surface of the tongue end of conduit 24. In addition, a small bead has been supplied at 48 to strengthen the sealing effect of the end 18 of conduit 24 so that the interface between the concrete and the seal extension balance 16 will be further reinforced against leakage. Finally, as will be subsequently explained, the perpendicular flap 20 has been found to facilitate casting of the pigot end of the conduit and further sealing capability as it interfaces with surface 30 of bell end seal 10.

Figure 2A:
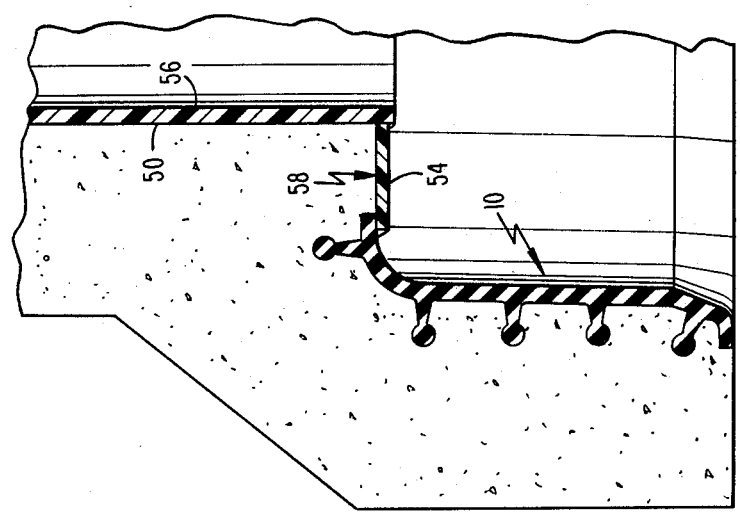
FIG. 2A is a fragmentary cross-sectional view of the bell end seal of FIG. 1A in a lined pipe.

With reference to FIGS. 2A and 2B, seals 10 and 12 are identical to those described relative to FIGS. 1A and 1B above. In addition however the inner surface 50 of the bell end, and the inner surface 52 of the spigot end is lined with a chemically impervious plastic liner. The liner may be polyvinylchloride or any similar resin material. In order to ensure a seal, however, a flap member 54 is affixed connecting the liner 56 and the bell end seal 10 to surround the inner bell portion 58. A similar flap member 60 is provided surrounding the spigot end portion 62 and connecting the liner 64 and seal 12. The flap members 54 and 60 typically are of a plastic material similar to that of the liner and are affixed either by heat welding, glue or the like.

With reference to FIGS. 3A and 3B, the bell end seal 10 and the spigot end seal 12 are identical to those described with reference to FIGS. 1A and 1B and 2A and 2B. In addition the liner 56 and the bell end and the liner 64 and the spigot end are also identical. However, instead of the flat members 54 and 60 an L-shaped member 68 is provided to connect liner 56 and bell end seal 10 to protect surface 58 and a similar L-shaped member 70 is provided at the spigot end to connect liner 64 and seal 12 and protect end surface 62.

With attention to FIG. 4 there is shown therein an altered embodiment of a spigot end seal 72. In this embodiment there is provided a longitudinal seal interface surface 74 which mounts an integral projection 76 which is a substitute for the conventional O-ring or snap ring retained, for example, Surface 74 terminates in a 90° lateral projection 76 at one end, and a 90° lateral projection 78 at the opposite end. With attention for example to FIG. 1A, surface 76 is intended to interface with surface 28, surface 74 is intended to interface with surface 26 and surface 78 is intended to interface with surface 30 of seal 10. There is also provided an inner surface 80 which is intended to interface with concrete (not shown). This surface mounts four mutually spaced ribs 82 which terminate in beads 84. Because there is no concave depression, the ribs 82 are all preferably ¼ inch in length and the beads 84 are all ¼ inch in diameter. Therefore, this embodiment presents no weakened portion of the tongue end which is more susceptible to shear forces.

With reference to FIG. 5, as discussed above relative to the seal in U.S. Pat. No. 4,394,025, the provision of a perpendicular extension 20 from surface 14 meshes with the tongue former mold 90 as shown. Therefore, when concrete is cast, the concrete will not seep between tongue former 90 and surface 14 via flap 20. This teen will present a much cleaner end face.

As described above, in order to be useful as a sewer pipe and meet the applicable specifications, the seal of this invention must meet a low pressure test. In a specific example, each length of pipe was required to be vacuum tested which consisted of subjecting the pipe to an internal pressure of $-10$ inches of mercury or $-5$ psi. It was required that for example in a 24 inch diameter pipe the pressure could not increase more than two inches of mercury or one psi in 50 seconds. As noted above, the ASTM standard for a 24-inch pipe is 2.16 seconds per foot or in a 7½ length pipe, 16.2 seconds. This is in contrast to the test time in the instant case of 50 seconds. Accordingly, the test required a seal exceeding the ASTM standard by 3.08 times. This requirement was easily met by the seal of this invention.

In summary, an improved seal for non-metallic pipe is described which sea will more than meet the pressure specifications for sewer pipe. The seal of this invention then may used either in a cast non-metallic pipe with or without lining to provide a vastly superior sewer pipe seal with a strengthened tongue section which will exhibit an improved ability to withstand shear forces and improved ability to prevent leakage at the seal concrete interface.

It is not intended to limit the instant invention to a concrete pipe. It will be obvious to those skilled in the rt that the seal of the instant invention is applicable to any cast non-metallic pipe.

While a specific embodiment for the invention has been shown and described in detail, it will be understood that the invention may be modified without departing from the spirit of the inventive principles as set forth in the appended claims.

What is claimed:

1. A pressure resistant system for joining concrete pipes in end to end relationship wherein said first pipe terminates in a bell end and the second pipe terminates in a complementary spigot end telescopically received therein, the bell end defining a bell end face and an internal offset face radially and axially offset from the bell end face, and the spigot end defining a spigot end face and an external offset face radially and axially offset from the spigot end face, the end face and offset face of said bell end and of said spigot end being connected, respectively, by inner and outer seal mounting surfaces, said system comprising:

a bell end sealing ring extending from the bell offset face to the bell end face along the bell seal mounting surface, said bell ring mounting a plurality of mutually space, outwardly directed, circumferential ribs embedded in said bell;

a spigot end sealing ring extending from the spigot offset face to the spigot end face along the spigot seal mounting surface, said spigot ring mounting a plurality of mutually spaced, inwardly directed, circumferential ribs embedded in said spigot, the end of said spigot ring adjacent said spigot offset face mounting an integral sealing flange extending outwardly substantially perpendicular to said mounting surface across the spigot offset face, said spigot ring further defining a central circumferential, concave groove embedded in said spigot an O-ring seal retained in the spigot ring groove between the spigot and bell sealing rings when the spigot end is telescopically received in the bell end, said spigot end sealing ring mounting a circumferentially inwardly directed lip extending along a portion of the spigot end face, a first circumferential rib disposed between the spigot end face and the concave groove, said first circumferential rib embedded in said spigot, a second circumferential inwardly directed rib disposed adjacent the O-ring seal on an opposite side thereof embedded in said spigot, and an additional pair of circumferential inwardly directed ribs, one of said pair located adjacent the sealing flange and the other said pair between aid flange and the concave groove but embedded in said spigot, said circumferential inwardly directed ribs disposed respectively adjacent the spigot end face and the O-ring seal are of a length less than the adjacent pair of said circumferential inwardly directed ribs.

2. The system of claim 1 wherein said bell sealing ring includes inwardly and outwardly directed lips disposed, respectively, along a portion of the bell offset and the bell end faces, the inwardly directed lip mounting a circumferential flange extending into the offset face.

3. The system of claim 1 further comprising an impervious plastic lining surrounding the inner surface of said pipe and extending from the bell offset face to the spigot end face add plastic means disposed at the bell offset face and the spigot end face connecting, respectively, the lining and the spigot end sealing ring and the lining and the bell end sealing ring.

4. The system of claim 3 wherein said plastic means comprises a pair of toroidal gaskets.

5. The system of claim 4 wherein said gaskets are L-shaped in cross-section.

6. A pressure resistant system for joining concrete pipes in end-to-end relationship wherein said first pipe terminates in a bell end and the second pipe terminates in a complementary spigot end telescopically received therein, the bell end defining a bell end face and an internal offset face radially and axially offset from the bell end face, end the spigot end defining a spigot end face and an external offset face radially and axially offset from the spigot end face, the end face and offset face of said bell end and of said spigot end being connected, respectively, by inner and outer seal mounting surfaces, said system comprising:

a bell end sealing ring extending from the bell offset face to the bell end face along the bell seal mounting surface, said bell ring mounting a plurality of mutually spaced, outwardly directed, circumferential ribs embedded in said bell;

a spigot end sealing ring extending from the spigot offset face to the spigot end face along the spigot seal mounting surface; said spigot ring mounting a plurality of mutually spaced, inwardly directed, circumferential ribs embedded in said spigot, the end of said spigot ring adjacent said spigot of said face mounting an internal sealing flange extending outwardly substantially perpendicular to said mounting surface across the spigot offset face;

an O-ring seal integrally mounted n the central portion of the spigot ring and extending circumferentially therearound, said seal disposed between the spigot and bell sealing rings when the spigot end is telescopically received in the bell end;

said spigot end sealing ring mounting a circumferentially inwardly directed lip extending along a portion of the spigot end face, a first circumferential rib disposed between the spigot end face and the O-ring seal, said first circumferential rib embedded in said spigot, a second circumferential inwardly directed rib disposed adjacent the O-ring seal on an opposite side thereof embedded in said spigot, and an additional pair of circumferential inwardly directed ribs, one of said pair located adjacent the ceiling flange and the other of said pair between said flange and the O-ring seal but embedded in said spigot; said circumferentially inwardly directed ribs disposed respectively adjacent the spigot end face and the O-ring seal are a length less than the adjacent pair of said circumferentially inwardly directed ribs.

* * * * *